(12) United States Patent
Pistinjat et al.

(10) Patent No.: US 12,086,040 B2
(45) Date of Patent: Sep. 10, 2024

(54) PREDICTION-BASED RESOURCE ORCHESTRATION IN A SERVICE FABRIC

(71) Applicant: Microsoft Technology Licensing, LLC, Redmond, WA (US)

(72) Inventors: Neda M. Pistinjat, Belgrade (RS); Nikola Puzovic, Belgrade (RS); Milan Micić, Belgrade (RS); Maja Stikic, Belgrade (RS); Nikola Pavlovic, Belgrade (RS); Jelena Petrovic, Belgrade (RS); Drazen Sumic, Belgrade (RS); Aleksa Brkic, Belgrade (RS); Vesna Todorovic, Belgrade (RS); Matthew T. Snider, Seattle, WA (US); Ivan Nedic, Kucura (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 18/051,375

(22) Filed: Oct. 31, 2022

(65) Prior Publication Data
US 2024/0143461 A1 May 2, 2024

(51) Int. Cl.
*G06F 11/20* (2006.01)
*G06F 11/34* (2006.01)

(52) U.S. Cl.
CPC ........ *G06F 11/203* (2013.01); *G06F 11/3423* (2013.01)

(58) Field of Classification Search
CPC .............................. G06F 11/203; G06F 11/3423
See application file for complete search history.

(56) References Cited

U.S. PATENT DOCUMENTS

| | | | |
|---|---|---|---|
| 8,234,236 B2 * | 7/2012 | Beaty | G06F 11/3452 706/45 |
| 2021/0279111 A1 | 9/2021 | Ranjan | |

OTHER PUBLICATIONS

"Azure Service Fabric documentation", Microsoft Learn, Sep. 19, 2022, Retrieved from the Internet: URL: https://web.archive.org/web/20220919111043/https://learn.microsoft.com/en-us/azure/service-fabric/, 3 pages.

(Continued)

*Primary Examiner* — Joseph R Kudirka
(74) *Attorney, Agent, or Firm* — Ranjeev Singh; Singh Law, PLLC

(57) ABSTRACT

Systems and methods related to prediction-based resource orchestration in a service fabric are described. An example method for reducing an interruption rate associated with a customer application offered as a collection of services includes predicting one or more quiet time periods associated with each of the service replicas associated with a service fabric, where each of the one or more quiet time periods corresponds to a low value of a predicted load specifying a consumption of a metric by a respective service replica on a given node. The method further includes during the one or more quiet time periods predicted by a trained machine learning model, performing an impact-less failover for one or more of the service replicas by scheduling a move for the one or more service replicas from a first node associated with the service fabric to a second node associated with the service fabric.

20 Claims, 8 Drawing Sheets

(56) References Cited

OTHER PUBLICATIONS

"Replicas and instances", Azure Service Fabric, Microsoft Learn, Jul. 15, 2022, retrieved from the Internet: URL: https://learn.microsoft.com/en-us/azure/service-fabric/service-fabric-concepts-replica-lifecycle, 7 pages.
International Search Report and Written Opinion received for PCT Application No. PCT/US23/033425, mailed on Nov. 20, 2023, 14 pages.

* cited by examiner

PREDICTION-BASED RESOURCE ORCHESTRATION IN A SERVICE FABRIC

BACKGROUND

Cloud computing systems are increasingly used to deploy services and applications for use by customers. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers across the globe.

The network of servers, and associated software, may be configured as nodes that are grouped into service fabric clusters. The services offered by the cluster of nodes may be managed in a manner that various customers being served by the cluster of nodes have appropriate access to physical resources, such as CPUs, memory, and storage disks. The resource consumption of a given service can change overtime. In addition, certain services may be more sensitive to the lack of availability of a certain type of physical resource (e.g., CPU time, memory, or storage space). Moreover, at times, certain nodes may fail or otherwise require scheduled maintenance, resulting in potential interruption of the services. Reactive management of such issues is ineffective.

Thus, there is a need for methods and systems for prediction-based resource orchestration in a service fabric cluster.

SUMMARY

In one example, the present disclosure relates to a method, implemented by a processor, for reducing an interruption rate associated with a customer application offered as a collection of services, where the collection of services is offered via a service fabric cluster comprising service replicas for execution by nodes associated with the service fabric cluster. The method may include using a trained machine learning model, predicting one or more quiet time periods associated with each of the service replicas, where each of the one or more quiet time periods corresponds to a low value of a predicted load specifying a consumption of a metric by a respective service replica on a given node.

The method may further include during the one or more quiet time periods predicted by the trained machine learning model, performing an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

In another example, the present disclosure relates to a system, including a processor, to reduce an interruption rate associated with a customer application offered as a collection of services, where the collection of services is offered via a service fabric cluster comprising service replicas for execution by nodes associated with the service fabric cluster. The system may include a prediction system configured to predict one or more quiet time periods associated with each of the service replicas, where each of the one or more quiet time periods corresponds to a low value of a predicted load specifying a consumption of a metric by a respective service replica.

The system may further include a cluster resource manager configured to, during the one or more quiet time periods predicted by the prediction system, perform an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

In yet another example, the present disclosure relates to a method, implemented by a processor, for reducing an interruption rate associated with a customer application offered as a collection of services, where the collection of services is offered via a service fabric cluster comprising service instances for execution by nodes associated with the service fabric duster. The method may include training a machine learning model to predict one or more quiet time periods associated with each of the service instances, where each of the one or more quiet time periods corresponds to a low value of a predicted load specifying a consumption of a metric by a respective service instance.

The method may further include during the one or more quiet time periods predicted by the machine learning model, performing an impact-less failover for one or more of the service instances associated with a stateless service by scheduling a move for the one or more service instances from a first node associated with the service fabric cluster to a second node associated with the service fabric cluster such that the impact-less failover is performed to eliminate or reduce any interruptions of the customer application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
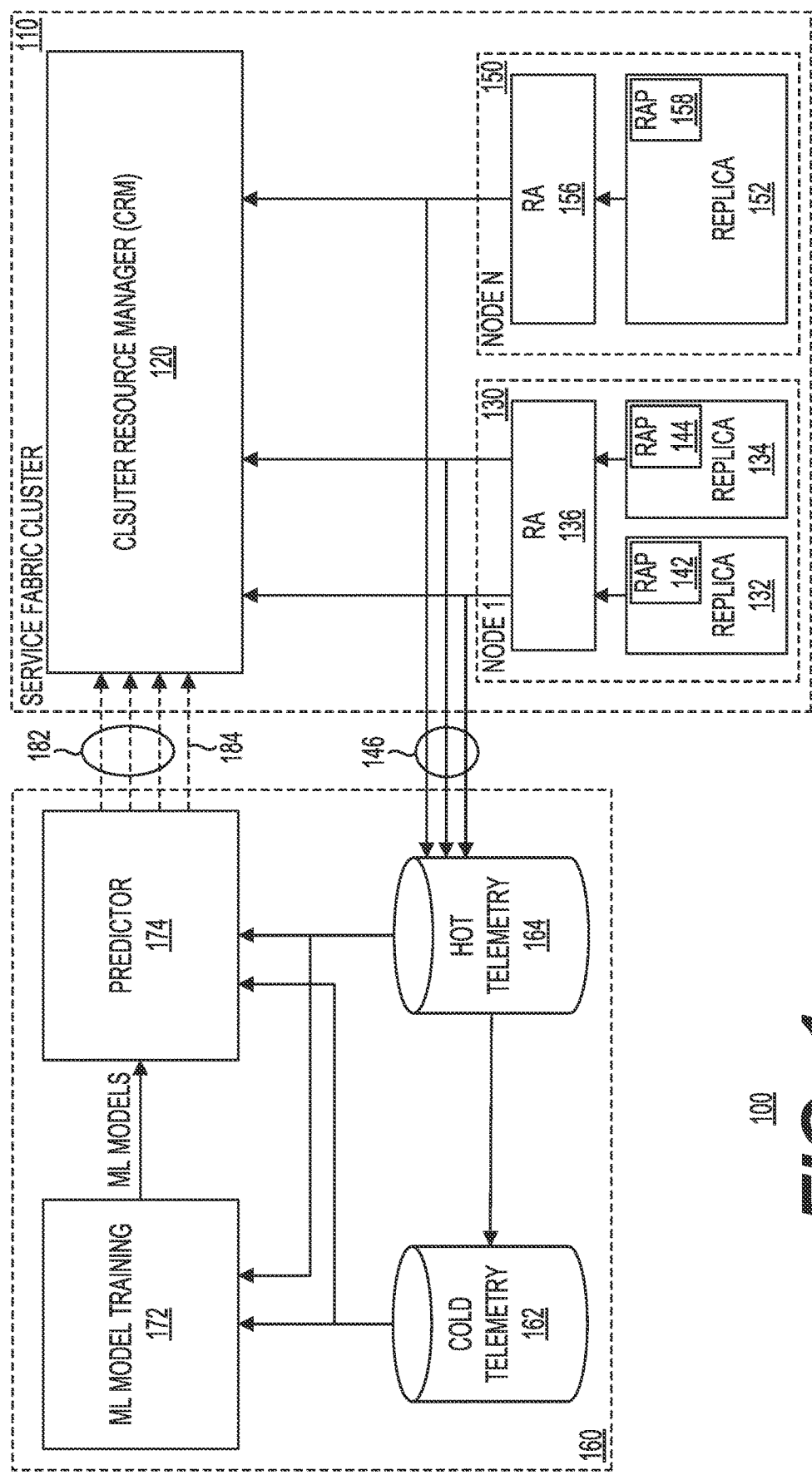
FIG. 1 shows a diagram of a system environment for prediction-based resource orchestration in a service fabric cluster in accordance with one example.

Examples described in this disclosure relate to prediction-based resource orchestration in a service fabric. Certain examples relate to moving service instances or replicas from one node to another node based on a prediction-based cluster resource manager for a service fabric cluster. A service fabric cluster is a network-connected set of virtual machines into which services can be deployed and managed. Virtual machines and the physical resources required to support virtual machines that belong to a service fabric cluster are referred to as nodes in the present disclosure. Thus, as an example, the nodes are the VMs that belong to a service fabric cluster. VMs may be deployed in the form of scalable sets, such that VM scale sets may allow one to create and manage a group of identical and load-balanced VMs that can be auto-scaled. Other configurations of VMs may also be used as nodes. Nodes may be of different types depending on their function in a service fabric cluster. As an example, certain nodes may be of the primary node type and other nodes may be of the secondary node type. The primary node types may run the service fabric system-services to support the platform capabilities of the service fabric. Nodes may be viewed as frontend or backend nodes depending upon their respective function.

Services offered by the service fabric perform a stand-alone function. As an example, a service may offer a database functionality (e.g., the SQL database functionality). Services are started and run independently of each other in a service fabric cluster. Example services may be of two types: stateless services or stateful services. A stateless service is a service that does not maintain its state within the service. A state may be used with a stateless service if the state is maintained using an external database to the service. A stateful service is a service that keeps state within the service. Stateful services may have replicas and stateless services may have instances. An instance of a stateless service is a copy of service logic (e.g., code) that is executed using one of the nodes of a service fabric cluster. Once an instance of a stateless service is created by the cluster resource manager (CRM), it may go through various states as part of its lifecycle. The CRM may create the instance and this state of the service may be referred to as the build state. Next, the stateless service instance may move into the ready state. The stateless service instance may enter a dropped state after it has gone through a closing state during which it is being shut down. A replica of a stateful service is a copy of the service logic (e.g., code) that is being executed using one of the nodes of a service fabric cluster. A replica may also maintain a copy of the state of that service. Replicas may have a lifecycle and also have roles. Replicas may be primary replicas or secondary replicas.

Service fabric allows applications to be deployed as a collection of microservices or services. Each client application package may correspond to an application manifest file that defines the different types of services contained in that application and pointers to the independent service logic packages. In sum, the service fabric is a distributed systems platform that makes it easy to package, deploy, and manage scalable and reliable microservices and containers. The service fabric is used as orchestrator for workloads by managing the resources associated with the service fabric. In the service fabric, resource management is performed by the Cluster Resource Manager (CRM). Thus, the CRM is responsible for making decisions about the placement of new replicas, replacement of existing replicas in case of failures, and for keeping the duster in an optimal state. The CRM may perform tasks, including placement, constraint checks, balancing, and upgrades (e.g., infrastructure upgrades or application upgrades). The placement aspect relates to starting new service instances or service replicas, managing failed instances or replicas, and deleting/dropping instances or replicas. The constraint checking aspect relates to ensuring compliance with constraints, including capacity constraints of nodes. The balancing aspect relates to managing the service instances and the service replicas to ensure a desired level of load within the duster.

In order to keep the service fabric cluster in an optimal state, the CRM may use metrics to monitor and to take remedial actions. A metric is anything that can be measured to monitor the resources in the context of the performance of services. Metrics may be physical metrics or logical metrics. Examples of physical metrics include metrics that correspond to physical resources, such as memory, disk and/or CPU usage. Logical metrics are application or user defined metrics that indirectly correspond to physical resource consumption. Examples of logical metrics include "Request-Count" or "QueueDepth," which are often used because it can be hard to measure and report consumption of the physical metrics on per service basis. Metrics may also have weights to reflect the priority of the metric for a particular service.

Within the service fabric cluster, nodes can fail or be added, services can be created or deleted, and the load, weight, or the number of metrics can be changed. The CRM will react to these events and perform its two core actions—constraint checks and balancing/optimization. If there are capacity "constraint violations" in the service fabric cluster (e.g., an overloaded node), the CRM will take corrective actions to remediate these issues (e.g., fix the constraint violation by moving a service from an overloaded node to some other node). If there are no capacity constraint violations in the cluster, the CRM may take optimization actions to bring the cluster into an optimal state (as defined by user-controlled policies, and CRM scoring logic). For example, there may be a policy describing how imbalanced the duster is allowed to be. If this value is exceeded, the CRM will reorganize the duster to rebalance the load in the duster. Because this is a reactive process, the corrections may take time to be generated and executed, especially in cases when correcting the issue requires moving/copying large amounts of state or large numbers of services. During this time users may experience issues like performance degradation or availability outage (such as the case where the hard drive is full).

The present disclosure also relates to an enhanced duster resource manager that can manage resources in a proactive and predictive way by utilizing knowledge about the workloads running in the service fabric duster. The resource usage is predicted based on historical data of replicas and the predictions are used to make intelligent placement/balancing/constraint check decisions so that the cluster does not end up in an invalid or imbalanced state (e.g., individual nodes do not get overloaded). In addition to the predictions, the CRM still harnesses the use of the metrics being monitored; so, even in the case of misprediction (or unexpected workload changes) the CRM continues to use actual load values as a safety net.

Advantageously, when an invalid state is predicted in advance, unlike in a reactive mode, the fix for the invalid state is not required immediately. The advance predictions enable impact-less failovers. By predicting idle periods for the service replicas on the node where a future invalid state is predicted, within a certain time before the predicted invalid state, failovers can be scheduled so that customers do not have any impact. Some customers may specify maintenance windows in which they prefer to have failovers. In such instances, those specified windows of time may be used to have failovers. This allows for reduced interruptions of the customers' applications. In addition to that, if a primary replica has to be moved out of the node, the failover of the primary replica is scheduled to the targeted node after the state of the stateful service has already been copied. In order to ensure that the primary replica failover happens while the end-user-service is inactive, the replica build time is also tracked and predicted.

At the same time, the use of predictions allows the customer resource manager (CRM) to reduce the total number of replica movements; moreover, the movements may be initiated only when the service fabric cluster is least active. Furthermore, the replica activity predictions enable the CRM to move replicas only when they are predicted to be inactive, reducing customer interruptions even further.

Without predictions, the CRM works in a reactive mode only, by performing activities such as placement, balancing and constraint checks, and movement generation only when based on the current service fabric cluster state there is a need for it. With the use of load predictions, the CRM becomes a proactive component that can predict a problematic state in advance and react before the service fabric cluster enters an invalid or a problematic state. The predictions further allow the CRM to have more time to find a better solution (with fewer movements) and keep the cluster in a healthy and balanced state.

In addition, by knowing the future need for resources, the CRM allocates needed resources for each replica in a balanced manner, and at the same time it reduces the number of failovers. This, in turn improves the availability of the service replicas and service instances, allowing for packing of more suitable workloads together on the same node, which increases the utilization of the nodes. Furthermore, the ability to predict in advance future problematic states allows the CRM more time to act. Thus, predictions are used not only to predict problematic states but also to find idle periods as well-periods of time during which the customer application is inactive and during which failovers do not have an impact on the customer.

FIG. 1 shows a diagram of a system environment 100 for prediction-based resource orchestration in a service fabric cluster 110 in accordance with one example. Service fabric cluster 110 includes a cluster resource manager (CRM) 120 that is managing the services being offered using multiple nodes (e.g., node 1 130 and node N 150). Each node may offer a stateful service or a s stateless service. This example assumes that stateful services via replicas are being offered. Node 1 130 has been configured with replicas 132 and 134. Node N 150 has been configured with replica 152. Each node may include a reconfiguration agent (e.g., RA 136 for node 1 130 and RA 156 for node N 150) for communicating with CRM 120. In addition, each replica may include a reconfiguration agent proxy (e.g., RAP 142 for replica 132, RAP 144 for replica 134, and RAP 158 for replica 152) for communicating with a respective reconfiguration agent for the node.

With continued reference to FIG. 1, system environment 100 may further include a prediction system 160. Prediction system 160 may receive telemetry data from service fabric cluster 110. As used herein, the term "telemetry" means data concerning the use, consumption, operation, and/or performance of software, service replicas and service instances, systems, applications, and components thereof, including for example, but without limitation, how often certain services are used, measurements of time related to provisioning and state changes of service replicas and service instances, hardware/nodes involved, application crashes, system operations, including physical metrics related information, counts of used features or other logical metrics, individual function timings, general load/usage statistics, and/or user specified constraints for services. Although prediction system 160 is shown as a separate component from service fabric cluster 110, some or all portions of the prediction system 160 may be implemented as a service that lives within service fabric cluster 110. Each replica may provide telemetry data (e.g., as shown via links 146) to prediction system 160. In this example, the reconfiguration agent for each node may aggregate telemetry data and provide it to prediction system 160. Such data may include metrics' related information (e.g., values for physical metrics or logical metrics, if any). Prediction system 160 may store the historic telemetry data in a database labeled cold telemetry 162. In addition, prediction system 160 may store more recent telemetry data in a database labeled hot telemetry 164. Prediction system 160 may further include both training and prediction components to allow for prediction-based resource orchestration in a service fabric cluster 110.

Still referring to FIG. 1, prediction system 160 may include machine language (ML) model training 172 and predictor 174. Prediction system 160 may operate in two modes: an offline mode and an online mode. In the offline mode, prediction system 160 may be trained using training data. Prediction system 160 may make predictions, including both activity predictions and load predictions and store them in a local database. Periodically, prediction system 160 may send the locally stored predictions to CRM 120. In the context of the offline mode, the term locally refers to the predictor 174 being implemented (as part of the service fabric cluster) as a prediction service. In an online mode, prediction system 160 may make predictions in real time and provide the predictions (e.g., activity predictions via links 182 and load predictions via link 184) to CRM 120. In addition, in the online mode, prediction system 160 may receive prediction reports generated by others. As an example, the service fabric customers may themselves generate predictions and provide those to the prediction system 160, which in turn may use these reports to either refine its own predictions or simply pass those predictions to CRM 120.

Figure 2:
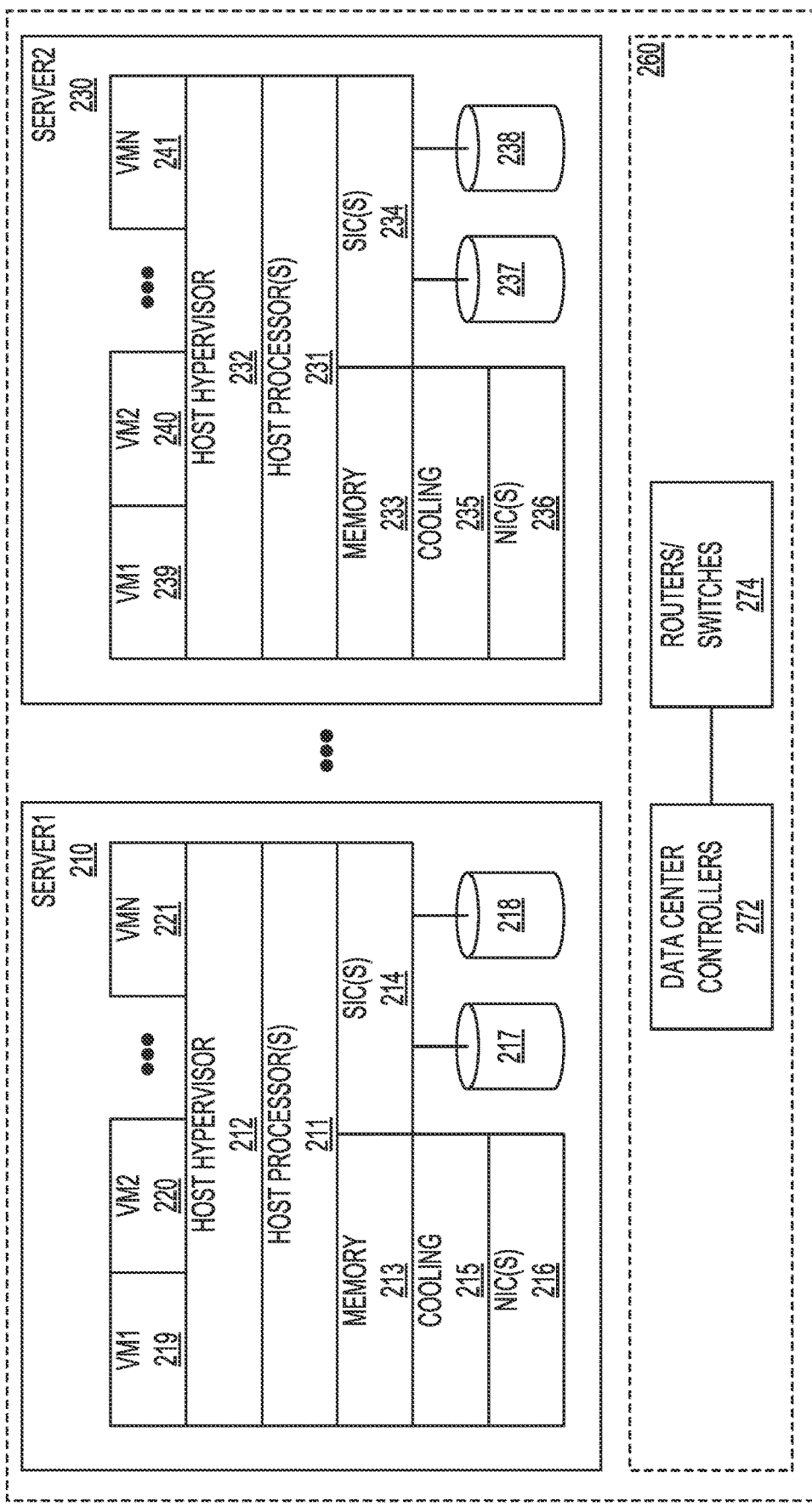
FIG. 2 shows a distributed computing system for implementing the service fabric cluster in accordance with one example.

FIG. 2 shows a distributed computing system 200 for implementing the service fabric cluster in accordance with one example. In this example, distributed computing system 200 may correspond to a portion of one or more data centers. As an example, a data center may include several clusters of racks including platform hardware, such as server nodes, storage nodes, networking nodes, or other types of nodes. Server nodes may be connected to switches to form a network. The network may enable connections between each possible combination of switches. Distributed computing system 200 may include server1 210 and server2 230.

Distributed computing system 200 may further include data center related functionality 260, including data center controllers 272 (e.g., software defined networking (SDN) controllers and other controllers), and routers/switches 274. Server1 210 may include host processor(s) 211, host hypervisor 212, memory 213, storage interface controller(s) (SIC(s)) 214, cooling 215, network interface controller(s) (NIC(s)) 216, and storage disks 217 and 218. Server2 230 may include host processor(s) 231, host hypervisor 232, memory 233, storage interface controller(s) (SIC(s)) 234, cooling 235, network interface controller(s) (NIC(s)) 236, and storage disks 237 and 238. Server1 210 may be configured to support virtual machines, including VM1 219, VM2 220, and VMN 221. Server2 230 may be configured to support virtual machines, including VM1 239, VM2 240, and VMN 241. The virtual machines may be part of one or more virtual machine sets allowing for scalability.

With continued reference to FIG. 2, in one example, distributed computing system 200 may be enabled for multiple customers using one or more gateways (not shown). Each service hosted by distributed computing system 200 may set up an endpoint for incoming requests that could be handled via any protocol or communication stack. As an example, each service deployed as part of a service fabric may listen on an IP port using an addressing scheme, such as a URI. Each service instance or replica supported by a host may be uniquely addressable. Service fabric may provide a naming service that may map (e.g., via a table) names of service instances or service replicas to the endpoint addresses. A combination of a domain name service (DNS) and the naming service may be used to provide additional flexibility for allowing customers to access services within distributed computing system 200. Although FIG. 2 shows distributed computing system 200 as including a certain number of components arranged and coupled in a certain way, it may include fewer or additional components arranged and coupled differently. In addition, the functionality associated with distributed computing system 200 may be distributed or combined, as needed.

Figure 3:
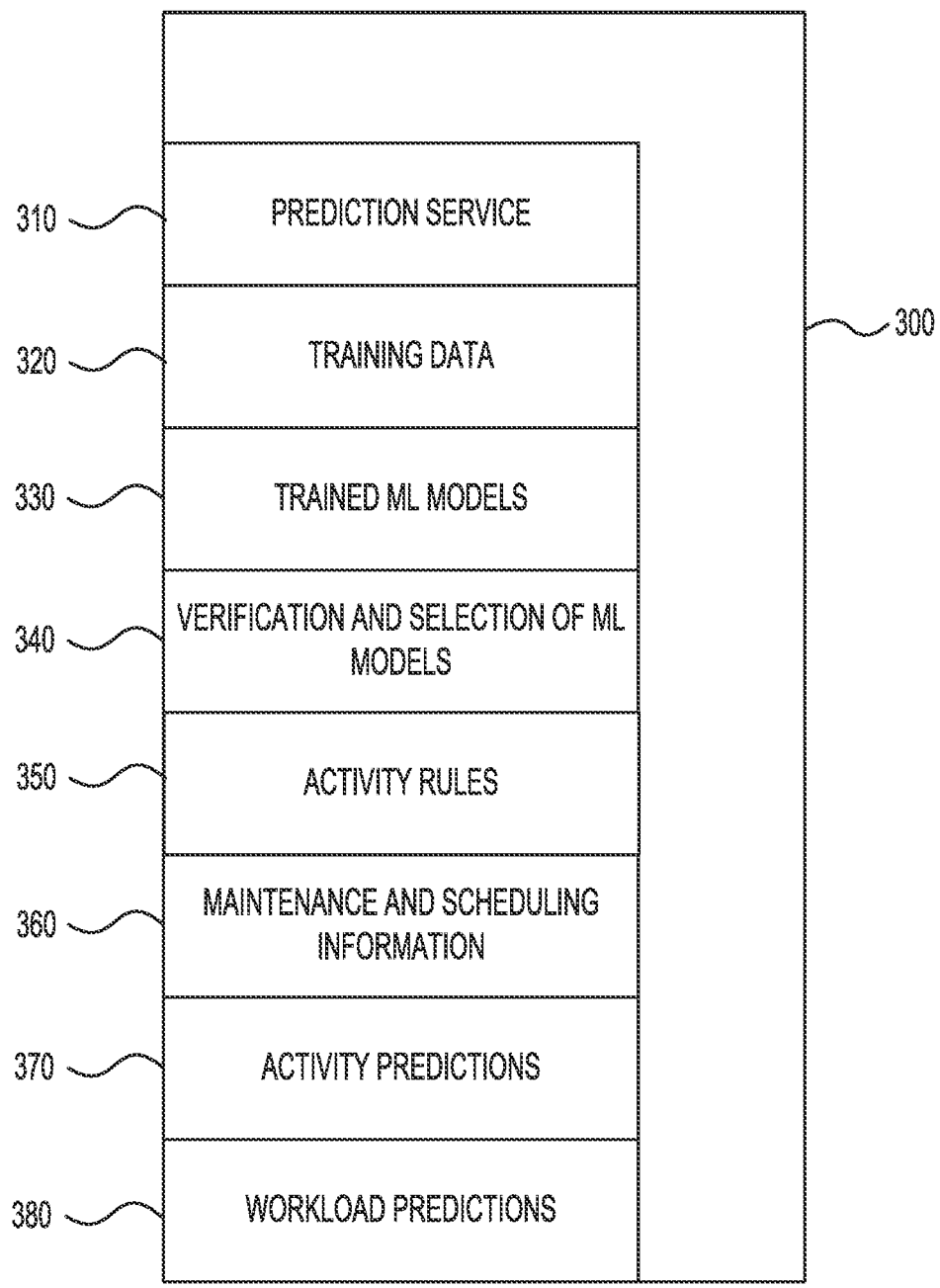
FIG. 3 shows a memory including instructions and data for prediction-based resource orchestration in a service fabric in accordance with one example.

FIG. 3 shows a memory 300 including instructions and data for prediction-based resource orchestration in a service fabric in accordance with one example. In this example, the instructions may be organized in memory 300 in the form of blocks or modules including code, data, or both. In this example, memory 300 may include prediction service 310, training data 320, trained machine learning (ML) models 330, verification and selection of trained ML models 340, activity rules 350, activity predictions 370, and workload predictions 380. Although FIG. 3 shows instructions and data organized in a certain way, the instructions and data may be combined or distributed in various ways.

With continued reference to FIG. 3, prediction service 310 may implement a supervised learning algorithm that can be trained based on input data and once it is trained it can make predictions or prescriptions based on the training. In this example, prediction service 310 may implement techniques such as Linear Regression, Support Vector Machine (SVM) set up for regression, Random Forest set up for regression, Gradient-boosting trees set up for regression and neural networks. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) or non-linear operations, if needed. Although FIG. 3 describes prediction service 310 as comprising instructions, the instructions could be encoded as hardware corresponding to an A/I processor. In this case, some or all of the functionality associated with the prediction service 310 may be hard-coded or otherwise provided as part of an A/I processor. As an example, an A/I processor may be implemented using an FPGA with the requisite functionality.

Training data 320 may be data that may be used to train neural network models or other types of machine learning models. In this example, training data 320 may include training data related to activity prediction 370 and training data related to workload prediction 380. As an example, the usage of a resource creates load on a given node such that the load reflects how much of a given metric is consumed by a service replica or a service instance on the given node. The training data related to workload prediction may include data that corresponds to metrics and the range of loads that each of the metrics can have. As an example, the CPU usage metric may be specified as a percentage of the CPU resource that is being consumed by a service replica or a service instance on a given node. Training data 320 may include data that can be used with workload prediction models such that for a given service replica or a service instance for a customer application, the workload over time can be predicted. Training data 320 may further include data that allows a trained machine learning model to predict any workload imbalances in the service fabric cluster that may occur in the future unless the service replicas or service instances are moved from one node to another. Training data 320 may include raw signal data (e.g., a time series) associated with workloads. Training data 320 may further include signal description (e.g., CPU is float).

Figure 4:
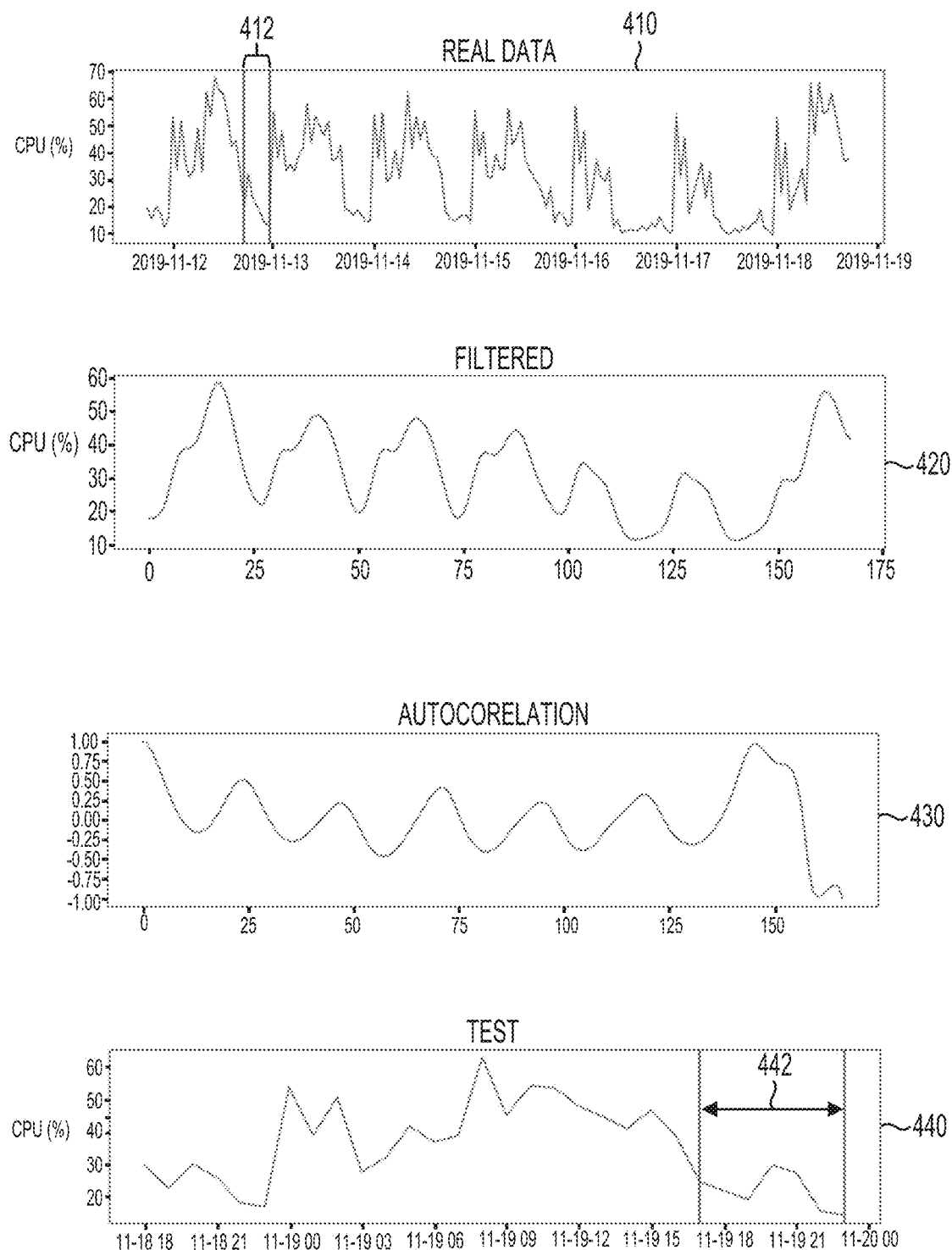
FIG. 4 shows waveforms for a periodicity detection model in accordance with one example.
Figure 5:
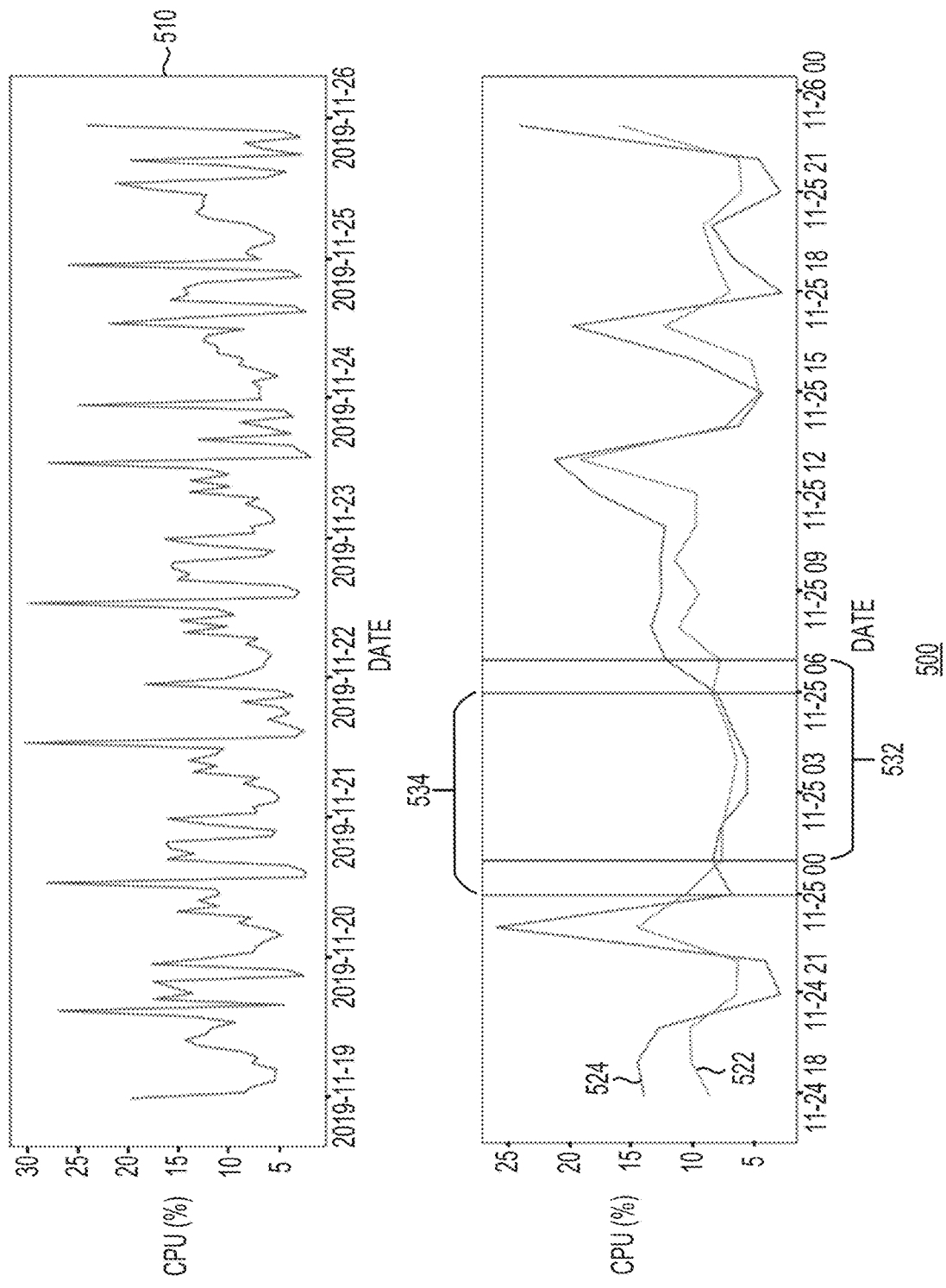
FIG. 5 shows waveforms for a "quiet" period detection model in accordance with one example.

Training data 320 may further include data that can be used to train machine learning models to predict periodicity associated with the predicted load and any quiet periods associated with the load (e.g., see additional description with respect to FIGS. 4 and 5). Such data may further include data that takes data size as an input feature (e.g., data size of a SQL database) and relates the data size to the time it will take to copy such data from one node to another node as part of a move of a service replica. Training data 320 may further include data that allows ML models 330 to be trained to predict replica and instance build time, including the time required for copying code for one or more replicas or instances from the memory associated with one node to another node.

ML models 330 may include machine language models that may be used as part of predictor 174 of prediction system 160. ML models 330 may include models that are created by the training process. An appropriate machine learning algorithm, included as part of prediction service 310, may find patterns in training data 320 that map a given set of input parameters to a set of predictions, including load prediction and activity predictions. Activity and workload predictions may be generated periodically (e.g., every two hours) and transferred from memory 300 to persistent storage for further processing by other components, including the cluster resource manager. As an example, a prediction collector may format the predictions in a manner that the cluster resource manager associated with the service fabric cluster can process the predictions as part of its tasks. Additional details with respect to activity predictions are provided with respect to FIGS. 4 and 5. Finally, other automated feedback models may also be used. As an example, such automated feedback models may not rely upon machine learning; instead, they may rely on other feedback mechanisms (e.g., historical resource usage or load) to allow for the balancing of a service fabric cluster. Regardless, in some cases, automated feedback models may use machine language models for learning, such as reinforcement learning models.

Verification and selection of ML models 350 may include code for evaluating the quality of the predictions made by prediction service 310. Verification of the models may include A/B testing of the different ML models. The predictions generated by the ML models could be compared with real data associated with workload predictions and activity predictions. As an example, models for detecting periodicity may be tweaked or otherwise improved if the existing models do not predict any periodicity despite the periodicity shown by the real data related to a particular metric for a load. The selection of models may be performed manually or automatically. As an example, based on a comparison of the models in relation to certain evaluation metrics, code may be executed to automatically choose the correct model.

Activity rules 350 may include rules and other information that describes the types of activity that needs prediction and rules associated with the prediction. As an example, a database service may be described as being active only if it uses more than 0.5 CPU resource and 1 GB of memory for at least 500 milliseconds. Similar rules may be specified for other types of activities or services.

Maintenance and scheduling information 360 may include information concerning the scheduling of maintenance of hardware or software associated with the nodes. Customers may provide information regarding scheduled maintenance windows. Such customer provided information may be used along with the workload predictions and activity predictions to schedule moves of service replicas and service instances.

Activity predictions 370 may include information concerning the predictions and the predictions themselves. As an example, activity predictions 370 may include configuration information for configuring prediction service 310. Such configuration information may include information for both the online mode and the offline mode operation of prediction service 310. The online mode configuration information may include details related to the sources of activity predictions and information regarding when activity predictions should be reported to the cluster resource manager (e.g., CRM 130 of FIG. 1). The offline mode configuration information may include various details related to making activity predictions, including: (1) the time period specifying how much history data should be used as part of the ML models, (2) the time period for which activity predictions are usable and not stale, and (3) information regarding which models should be run. The offline mode configuration may further include information regarding when activity predictions should be reported to the cluster resource manager (e.g., CRM 130 of FIG. 1).

Workload predictions 380 may include information concerning the predictions and the predictions themselves. As an example, workload predictions 380 may include configuration information for configuring prediction service 310. Such configuration information may include information for both the online mode and the offline mode operation of prediction service 310. The online mode configuration information may include details related to the sources of workload predictions and information regarding when workload predictions should be reported to the cluster resource manager (e.g., CRM 130 of FIG. 1). The offline mode configuration information may include various details related to making workload predictions, including: (1) the time period specifying how much history data should be used as part of the ML models, (2) the time period for which workload predictions are usable and not stale, and (3) information regarding which models should be run. The offline mode configuration may further include information regarding when workload predictions should be reported to the cluster resource manager (e.g., CRM 130 of FIG. 1).

FIG. 4 shows waveforms 400 for a periodicity detection model in accordance with one example. In this example, waveform 410 shows the percentage usage of a central processing unit (CPU) resource by a service replica over several days. In general, the usage of a resource creates load on a given node such that the load reflects how much of a given metric is consumed by a service replica or a service instance on the given node. Waveform 410 may be created by processing the CPU usage metric associated with a service replica over certain time. Portion 412 of waveform 410 shows a low activity period for the service replica. Prediction system 160 is configured to predict such low activity or "quiet" periods during which a service replica may be intelligently moved from one node to another. A move that causes service interruption in terms of the disruption of the connections between the service replica (or the service instance) and the client applications is viewed as an impactful failover. Another move that does not cause service interruption is viewed as an impact-less failover. Predicted quiet periods allow for making moves that result in impact-less failover. Waveform 420 shows a filtered version of waveform 410. Filtering involves exponential smoothing of the waveform to reduce or eliminate noise.

With continued reference to FIG. 4, waveform 430 shows an autocorrelated version of waveform 420. In one example, the autocorrelated version is generated by autocorrelating the signal for each day with the entirety of a set of signals collected over a larger period (e.g., a month). Peaks in waveform 430 indicate daily periodicity associated with the percentage usage of a central processing unit (CPU) resource by a service replica over several days. Waveform 440 shows a zoomed in view of waveform 410 showing a low activity period 442. Low activity period 442 is detected by computing a moving average of the CPU usage by the service replica over certain time periods (e.g., 3-4 hours per day). The sliding moving average is evaluated for the same time periods for each day to determine periodic low activity during certain periods (e.g., the period between 12 AM and 3 AM) on certain days of the month or the week. Intelligent moves can be scheduled for such low activity periods. Although FIG. 4 shows detecting periodicity based on the historical usage of the CPU resource, periodicity based on the usage of any number of physical resources and logical resources, or combinations thereof, may be detected using similar models.

FIG. 5 shows waveforms 500 for a "quiet" period detection model in accordance with one example. In certain situations, the resource usage for the metric of interest may not have a daily or some other form of periodicity. In such situations, other models may be used to detect the "quiet" period that corresponds to low activity with respect to the usage of a metric (e.g., the CPU resource). As an example, the autoregressive integrated moving average (ARIMA) class of models may be used. In this example, waveform 510 shows the percentage usage of a central processing unit (CPU) resource by a service replica over several days. Waveform 510 may be created by processing the CPU usage metric associated with a service replica over a certain amount of time (e.g., a week). Waveform 522 shows the predicted usage of the CPU resource by the service replica during a time period. As explained earlier, prediction system 160 uses machine language trained models to predict usage of resources, including resources corresponding to both physical metrics and logical metrics. In this example, portion 532 of waveform 522 shows the predicted quiet period. Waveform 524 shows the actual usage of the CPU resource by the service replica during the same time period. As explained earlier, actual usage may be computed based on the moving average of the usage of the resource. Portion 534 of waveform 532 shows the actual quiet period. As explained earlier, models for predicting quiet periods may be verified by comparing their performance with real usage values. Based on the testing of the various models, a model that provides the best predictions for a service replica may be used. Although FIG. 5 shows detecting a quiet period based on the predicted usage of the CPU resource, a quiet period based on the usage of any number of physical resources and logical resources, or combinations thereof, may be detected using similar models.

Figure 6:
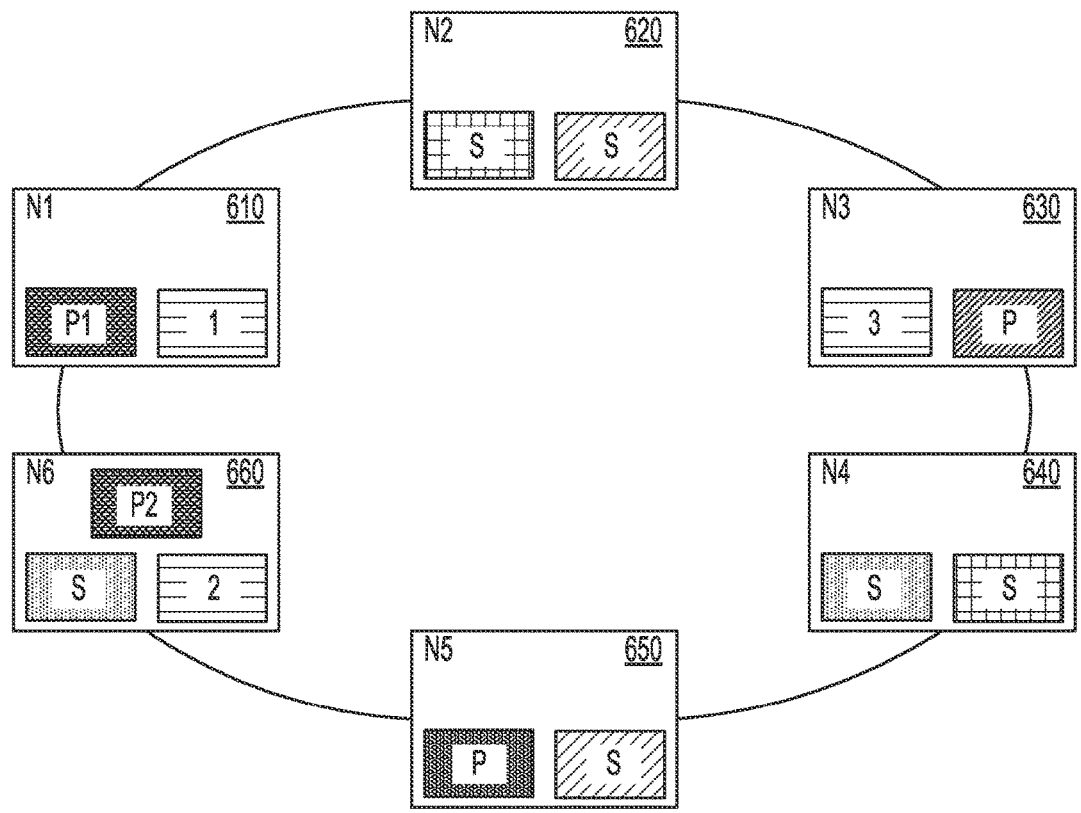
FIG. 6 shows an example service fabric cluster including stateful service replicas and stateless service instances where prediction-based resource orchestration may be implemented.
Figure 6:
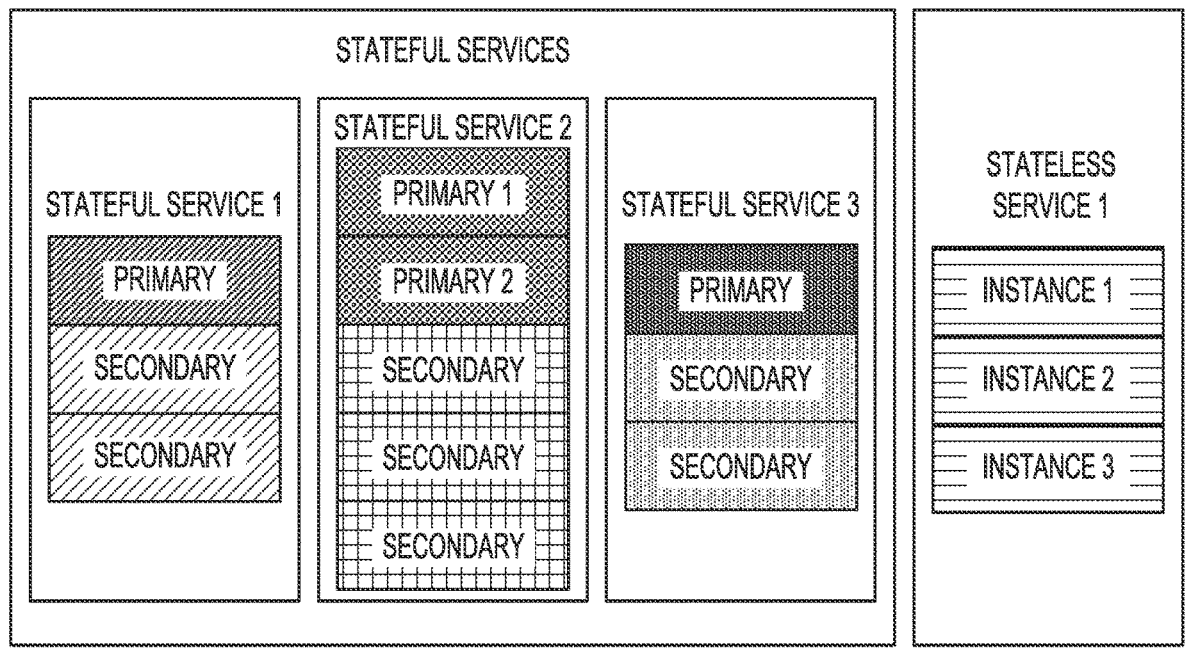

FIG. 6 shows an example service fabric cluster 600 including stateful service replicas and stateless service instances where prediction-based resource orchestration may be implemented. In this example, service fabric cluster 600 includes six nodes: node N1 610, node N2 620, node N3 630, node N4 640, node N5 650, and node N6 660. As explained earlier, the nodes are the VMs that belong to a service fabric cluster. VMs may be deployed in the form of scalable sets, such that VM scale sets may allow one to create and manage a group of identical and load-balanced VMs that can be auto-scaled. Other configurations of VMs may also be used as nodes. Nodes may be of different types depending on their function in a service fabric cluster.

With continued reference to FIG. 6, service fabric cluster 600 may offer a collection of services, including both stateful services and stateless services. A stateless service is a service that does not maintain its state within the service. A state may be used with a stateless service if the state is maintained using an external database to the service. A stateful service is a service that keeps state within the service. Stateful services may have replicas and stateless services may have instances. An instance of a stateless service is a copy of service logic (e.g., code) that is executed using one of the nodes of a service fabric cluster. In this example, service fabric cluster 600 offers three stateful services (stateful service 1, stateful service 2, and stateful service 3) and one stateless service (stateless service 1). Stateful service 1 has one primary replica and two secondary replicas. Stateful service 2 has two primary replicas (P1 and P2) and three secondary replicas. Stateful service 3 has one primary replica and two secondary replicas. Stateless service 1 has three instances (instance 1, instance 2, and instance 3). Prediction system 160 described earlier may generate load predictions associated with any number and any combination of logical and physical metrics for these services. As explained earlier, the load reflects how much of a given metric is consumed by a service replica or a service instance on a given node. Prediction system 160 is further configured to predict low activity or "quiet" periods during which a service replica may be intelligently moved from one node to another. A move that causes service interruption in terms of the disruption of the connections between the service replica (or the service instance) and the client applications is viewed as an impactful failover. Another move that does not cause service interruption is viewed as an impact-less failover. Predicted quiet periods allow for making moves that result in impact-less failover.

Still referring to FIG. 6, assuming node N6 660 requires a scheduled maintenance in the near future, based on the predicted quiet time periods for primary replica P2, primary replica P2 may be moved during one of the predicted quiet time periods to node N2 620 or another node associated with the service fabric to ensure a balanced load among the nodes. A move for the service from node N6 660 to a different node associated with the service fabric may include: (1) building a secondary replica for the service (unless one already exists) at another node (e.g., node N2 620), (2) promoting the newly built or the already existing secondary replica for the service to a primary replica status for the service, and (3) demoting the primary replica P2 at node N6 660 to a secondary replica status and shutting down the code for the demoted primary replica P2 at node N6 660. Similarly, based on predicted quiet time periods for the secondary replica for stateful service 3, the secondary replica may be moved during one of the predicted quiet time periods to node N5 650 or another node associated with the service fabric to ensure a balanced load among the nodes. The move may include: (1) seeding a secondary replica at node N5 650 (or another node associated with the service fabric), (2) running the code for the secondary replica at the other node (e.g., node N5 650 or another node associated with the service fabric), and (3) shutting down the code for the secondary replica at node N6 660. Finally, based on predicted quiet time periods for instance 2 of the stateless service, instance 2 may be moved during one of the predicted quiet time periods to node N4 640 or another node associated with the service fabric to ensure a balanced load among the nodes. The move may include: (1) seeding instance 2 at node N4 640 (or another node associated with the service fabric), (2) running the code for the instance 2 of stateless service 1 at the other node (e.g., node N4 640 or another node associated with the service fabric), and (3) shutting down the code for instance 2 at node N6 660. Before moving the primary replicas, the secondary replicas, or the service instances from one node to another node within the service fabric, the CRM associated with the service fabric may take into account predicted load (and other placement constraints) for the various nodes in the service fabric. Although not shown in FIG. 6, each stateful service may be partitioned such that the primary replicas for the stateful service may be distributed across nodes. Moreover, to improve the reliability of the stateful service, the replicas for the same partition are placed on different nodes Moving of the replicas and the instance associated with node N1 610 in this manner results in an impact-less failover with little or no interruption for any customer applications being offered as the collection of services hosted by the service fabric. Replicas may also be moved in response to application upgrades or infrastructure upgrades. An application upgrade may relate to modifications of any of the code for the replica, the configuration of the application or the replica, or the data associated with the application. Infrastructure upgrades may relate to changes to the operating systems, networks, or other components associated with the nodes. In some situations, a group of nodes that belong to the same upgrade domain may be upgraded simultaneously. Any movement of service replicas or service instances in response to upgrades may be scheduled during predicted quiet periods while considering the predicted build times associated with any service replicas and/or service instances. Although predicted quiet periods are used to schedule any moves of the service replicas or service instances, the node to which a particular replica or instance is moved depends on compliance with placement rules, constraint checks, and balancing. As explained before, the placement aspect relates to starting new service instances or service replicas, managing failed instances or replicas, and deleting/dropping instances or replicas. The constraint checking aspect relates to ensuring compliance with constraints, including capacity constraints of nodes. The balancing aspect relates to managing the service instances and the service replicas to ensure a desired level of load within the cluster. Advantageously, when an invalid state is predicted in advance, unlike in a reactive mode, the fix for the invalid state is not required immediately. The advance predictions enable impact-less failovers. By predicting idle periods for the service replicas on the node where a future invalid state is predicted, within a certain time before the predicted invalid state, failovers can be scheduled so that customers do not have any impact. Some customers may specify maintenance windows in which they prefer to have failovers. In such instances, those specified windows of time may be used to have failovers. This allows for reduced interruptions of the customers' applications. In addition to that, if a primary replica has to be moved out of the node, the failover of the primary replica is scheduled to the targeted node after the state of the stateful service has already been copied. In order to ensure that the primary replica failover happens while the end-user-service is inactive, the replica build time is also tracked and predicted.

As explained earlier with respect to FIG. 2, each service hosted in a service fabric cluster may set up an endpoint for incoming requests that could be handled via any protocol or communication stack. As an example, each service deployed as part of a service fabric may listen on an IP port using an addressing scheme, such as a URI. Each service instance or replica supported by a node or host may be uniquely addressable. Service fabric may provide a naming service that may map (e.g., via a table) names of service instances or service replicas to the endpoint addresses. A combination of a domain name service (DNS) and the naming service may be used to provide additional flexibility for allowing customers to access services. In sum, any movement of service replicas or service instances that results in a movement of the entire service may be handled as explained herein. The service fabric duster may also provide a reverse proxy service to abstract the naming service further. Although FIG. 6 shows a certain configuration associated with a service fabric cluster 600, the service fabric cluster may include additional or fewer nodes that may offer different services via other service replicas or service instances.

Figure 7:
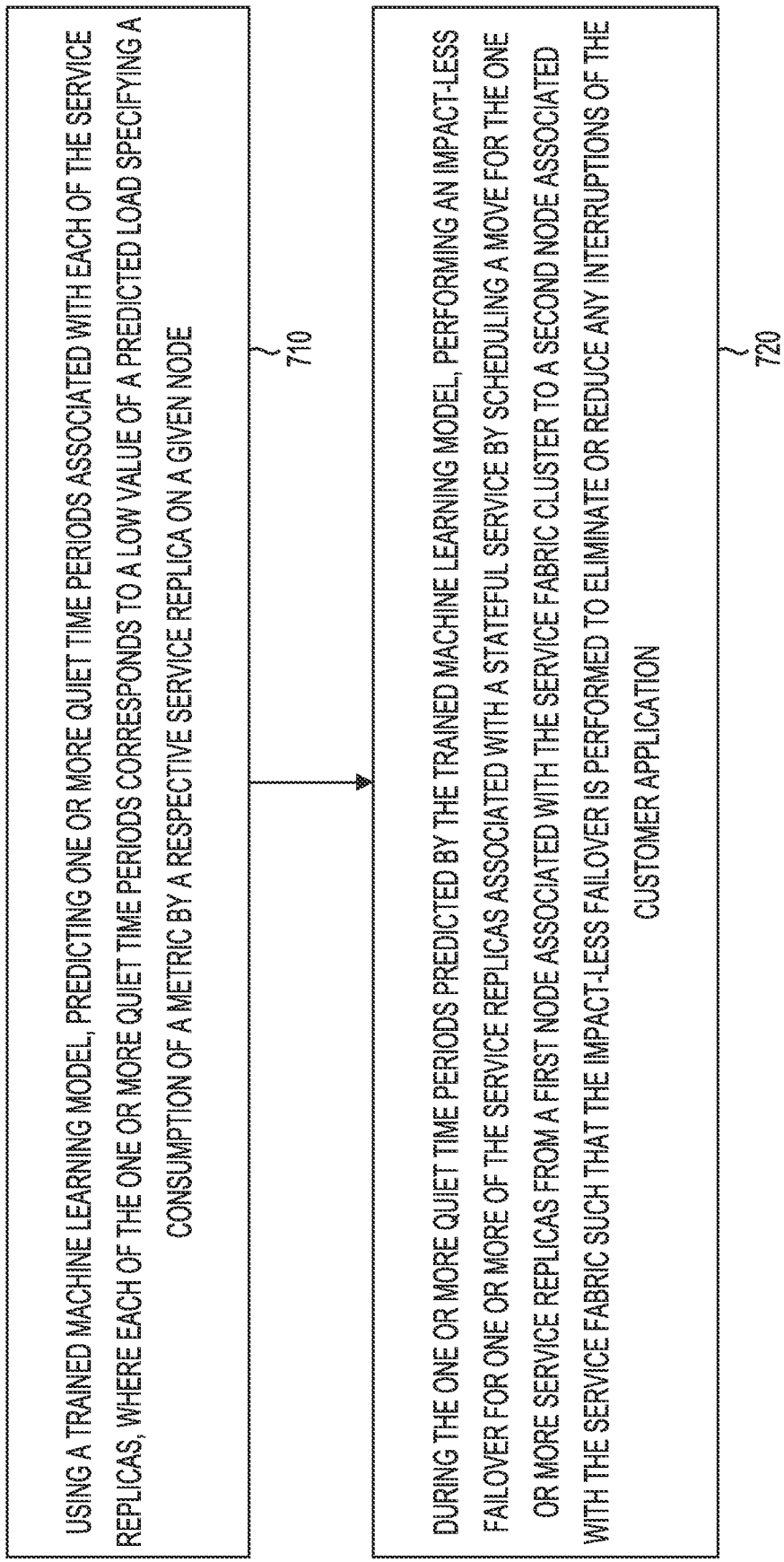
FIG. 7 shows a flow chart of a method for prediction-based resource orchestration in a service fabric in accordance with one example.

FIG. 7 shows a flow chart 700 of a method for prediction-based resource orchestration in a service fabric cluster in accordance with one example. The steps associated with this method may be performed using instructions executed by a processor (e.g., any of the host processors of FIG. 2 or another processor) The performance of the steps associated with this method results in a reduction of an interruption rate associated with a customer application offered as a collection of services, where the collection of services is offered via a service fabric cluster comprising service replicas for execution by the nodes associated with the service fabric cluster. Step 710 may include using a trained machine learning model, predicting one or more quiet time periods associated with each of the service replicas, where each of the one or more quiet time periods corresponds to a low value of a predicted load specifying a consumption of a metric by a respective service replica. As explained earlier with respect to FIGS. 1-6, quiet time periods may be predicted based on trained machine learning models (e.g., the models described earlier with respect to FIGS. 3-5). In addition, predicting one or more quiet time periods associated with each of the service replicas may include determining any periodicity associated with the consumption of the metric by a respective service replica. The metric need not be a single physical metric or a single logical metric, and can be a combination of physical metrics, a combination of logical metrics, or a combination of physical metrics and logical metrics. The trained machine learning model may be deployed as part of a stateful prediction service (e.g., as prediction service 310) within the service fabric cluster (e.g., service fabric cluster 110 of FIG. 1).

Step 720 may include, during the one or more quiet time periods predicted by the machine learning model, performing an impact-less failover for one or more of the service replicas associated with a service by scheduling a move for the one or more service replicas from a first node associated with the service fabric cluster to a second node associated with the service fabric cluster such that the impact-less failover is performed to eliminate or reduce any interruptions of the customer application. Each of the collection of services may be configured to start and run independently of each other such that a move associated with a service from among the collection of services does not require a move for another service. In addition, as explained earlier, the service replicas may be one or more primary replicas. As explained earlier (e.g., with respect to FIG. 6), the move for the one or more primary replicas from the first node associated with the service fabric cluster to the second node associated with the service fabric cluster may include: (1) building one or more secondary replicas at the second node, (2) promoting the one or more secondary replicas at the second node to primary replica status, and (3) demoting the one or more primary replicas at the first node to secondary replica status and shutting down the code for the demoted one or more replicas at the first node. The service replicas may also be one or more secondary replicas, which may also be moved. A move for the one or more secondary replicas from the first node associated with the service fabric cluster to the second node associated with the service fabric cluster may include: (1) seeding the secondary replicas at the second node and (2) running the code for the one or more secondary replicas at the second node. Although the moves of replicas are described as involving certain steps, not every move will require all of these steps. As an example, if a primary replica is being moved to a node that already has a secondary replica on it, then the secondary replica may be promoted to be the primary replica. At a later time, the secondary replica could be built and placed at the same node or another node, as per the load-balancing or other placement constraints. In addition, as explained earlier, the trained machine learning model deployed as part of a stateful prediction service (e.g., as prediction service 310) within the service fabric cluster (e.g., service fabric cluster 110 of FIG. 1) may also predict the replica build times for both primary and secondary replicas. The predicted build times may be used to ensure moves in a manner that eliminates any service interruption.

Figure 8:
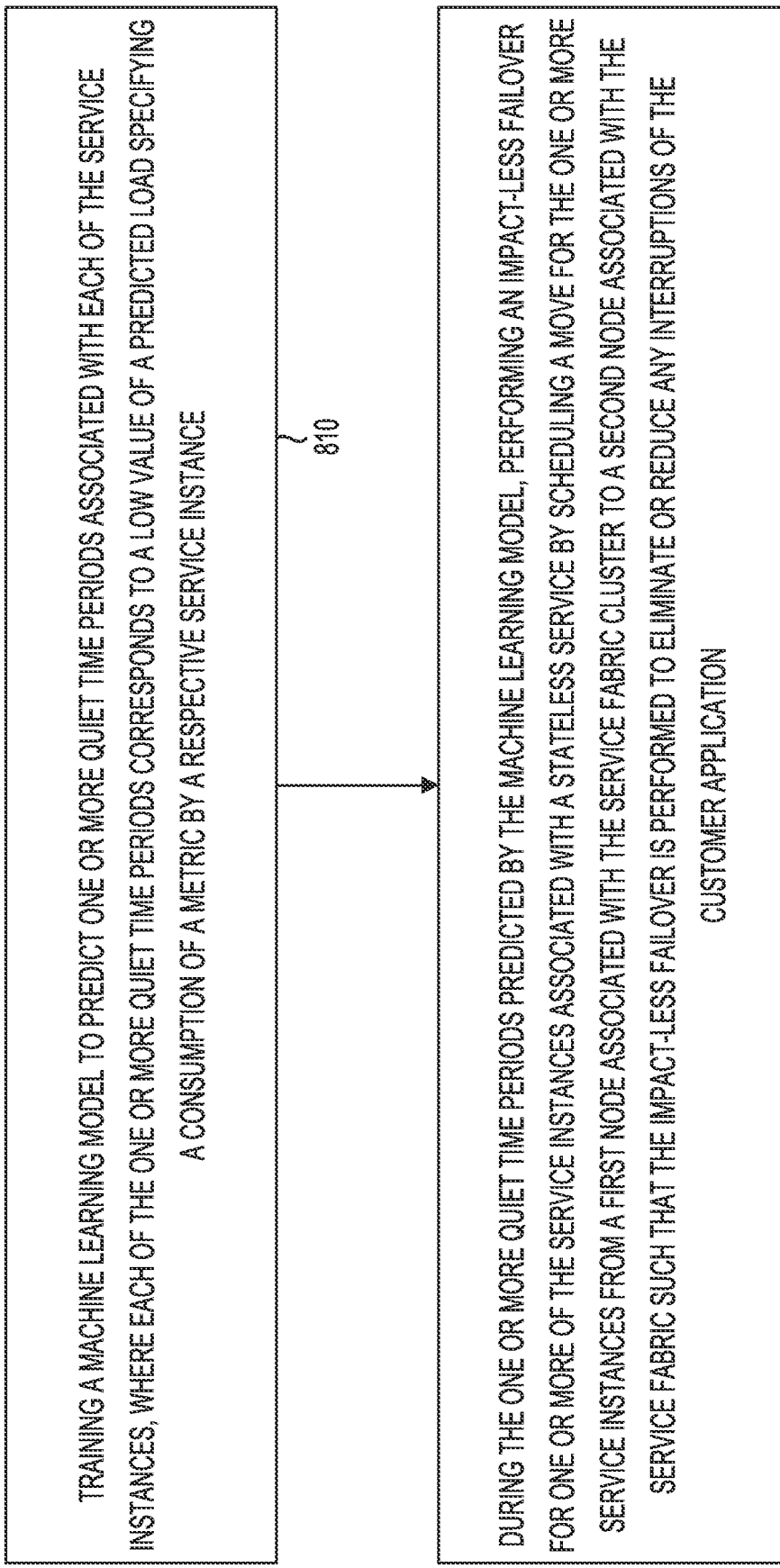
FIG. 8 shows a flow chart of another method for prediction-based resource orchestration in a service fabric in accordance with one example.

FIG. 8 shows a flow chart 800 of a method for prediction-based resource orchestration in a service fabric cluster in accordance with one example. The steps associated with this method may be performed using instructions executed by a processor (e.g., any of the host processors of FIG. 2 or another processor) The performance of the steps associated with this method results in a reduction of an interruption rate associated with a customer application offered as a collection of services, where the collection of services is offered via a service fabric cluster comprising service instances for execution by the nodes associated with the service fabric cluster. Step 810 may include training a machine learning model to predict one or more quiet time periods associated with each of the service instances, wherein each of the one or more quiet time periods corresponds to a low value of a predicted load specifying a consumption of a metric by a respective service instance. As explained earlier with respect to FIGS. 1-6, quiet time periods may be predicted based on trained machine learning models (e.g., the models described earlier with respect to FIGS. 3-5). In addition, predicting one or more quiet time periods associated with each of the service instances may include determining any periodicity associated with the consumption of the metric by a respective service instance. The metric need not be a single physical metric or a single logical metric, and can be a combination of physical metrics, a combination of logical metrics, or a combination of physical metrics and logical metrics. The trained machine learning model may be deployed as part of a stateful prediction service (e.g., as prediction service 310) within the service fabric cluster (e.g., service fabric cluster 110 of FIG. 1).

Step 820 may include, during the one or more quiet time periods predicted by the machine learning model, performing an impact-less failover for one or more of the service instances associated with a stateless service by scheduling a move for the one or more service instances from a first node associated with the service fabric cluster to a second node associated with the service fabric cluster such that the impact-less failover is performed to eliminate or reduce any interruptions of the customer application. Each of the collection of services may be configured to start and run independently of each other such that a move associated with a service from among the collection of services does not require a move for another service. A move for the one or more service instances from the first node associated with the service fabric cluster to the second node associated with the service fabric cluster may include: (1) seeding one or more service instances at the second node, (2) running the code for the one or more service instances at the second node, and (3) shutting down code for the one or more service instances at the first node. In addition, as explained earlier, the trained machine learning model deployed as part of a stateful prediction service (e.g., as prediction service 310) within the service fabric cluster (e.g., service fabric cluster 110 of FIG. 1) may also predict the replica build times for both primary and secondary replicas. Similarly, the trained machine learning model deployed as part of a stateful prediction service (e.g., as prediction service 310) within the service fabric cluster (e.g., service fabric cluster 110 of FIG. 1) may also predict the service instance build times. The predicted build times may be used to ensure moves in a manner that eliminates any service interruption.

In conclusion, the present disclosure relates to a method, implemented by a processor, for reducing an interruption rate associated with a customer application offered as a collection of services, where the collection of services is offered via a service fabric cluster comprising service replicas for execution by nodes associated with the service fabric cluster. The method may include using a trained machine learning model, predicting one or more quiet time periods associated with each of the service replicas, where each of the one or more quiet time periods corresponds to a low value of a predicted load specifying a consumption of a metric by a respective service replica on a given node.

The method may further include during the one or more quiet time periods predicted by the trained machine learning model, performing an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

Predicting the one or more quiet time periods associated with each of the service replicas may comprise determining any periodicity associated with the consumption of the metric by a respective service replica. The metric may comprise one of a physical metric, a logical metric, a combination of physical metrics, a combination of logical metrics, or a combination of physical metrics and logical metrics. The trained machine learning model may be deployed as part of a stateful prediction service within the service fabric cluster. The trained machine learning model may further be configured to predict build times for the one or more of the service replicas associated with the stateful service.

Each of the collection of services may be configured to start and run independently of each other such that a move associated with a service from among the collection of services does not require a move for another service. The service replicas may include one or more primary replicas, and a move for the one or more primary replicas from the first node associated with the service fabric cluster to the second node associated with the service fabric cluster may comprise: (1) building one or more secondary replicas for the stateful service at the second node, (2) promoting the one or more secondary replicas to a primary replica status at the second node, and (3) demoting the one or more primary replicas at the first node to a secondary replica status. The service replicas may include one or more secondary replicas, and a move for the one or more secondary replicas from the first node associated with the service fabric cluster to the second node associated with the service fabric cluster may comprise: (1) seeding the secondary replicas at the second node and (2) running the code for the one or more secondary replicas at the second node.

In another example, the present disclosure relates to a system, including a processor, to reduce an interruption rate associated with a customer application offered as a collection of services, where the collection of services is offered via a service fabric cluster comprising service replicas for execution by nodes associated with the service fabric cluster. The system may include a prediction system configured to predict one or more quiet time periods associated with each of the service replicas, where each of the one or more quiet time periods corresponds to a low value of a predicted load specifying a consumption of a metric by a respective service replica.

The system may further include a cluster resource manager configured to, during the one or more quiet time periods predicted by the prediction system, perform an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

The one or more predicted quiet time periods associated with each of the service replicas may be determined in relation to any periodicity associated with the consumption of the metric by a respective service replica. The metric may include one of a physical metric, a logical metric, a combination of physical metrics, a combination of logical metrics, or a combination of physical metrics and logical metrics.

Each of the collection of services may be configured to start and run independently of each other such that a move associated with a service from among the collection of services does not require a move for another service. The service replicas may include one or more primary replicas, and a move for the one or more primary replicas from the first node associated with the service fabric cluster to the second node associated with the service fabric cluster may comprise: (1) building one or more secondary replicas for the stateful service at the second node, (2) promoting the one or more secondary replicas to a primary replica status at the second node, and (3) demoting the one or more primary replicas at the first node to a secondary replica status. The service replicas may include one or more secondary replicas, and a move for the one or more secondary replicas from the first node associated with the service fabric cluster to the second node associated with the service fabric cluster may comprise: (1) seeding the secondary replicas at the second node and (2) running the code for the one or more secondary replicas at the second node.

In yet another example, the present disclosure relates to a method, implemented by a processor, for reducing an interruption rate associated with a customer application offered as a collection of services, where the collection of services is offered via a service fabric cluster comprising service instances for execution by nodes associated with the service fabric cluster. The method may include training a machine learning model to predict one or more quiet time periods associated with each of the service instances, where each of the one or more quiet time periods corresponds to a low value of a predicted load specifying a consumption of a metric by a respective service instance.

The method may further include during the one or more quiet time periods predicted by the machine learning model, performing an impact-less failover for one or more of the service instances associated with a stateless service by scheduling a move for the one or more service instances from a first node associated with the service fabric cluster to a second node associated with the service fabric cluster such that the impact-less failover is performed to eliminate or reduce any interruptions of the customer application.

Predicting the one or more quiet time periods associated with each of the service instances may comprise determining any periodicity associated with the consumption of the metric by a respective service instance. The metric may comprise one of a physical metric, a logical metric, a combination of physical metrics, a combination of logical metrics, or a combination of physical metrics and logical metrics. The machine learning model may be deployed as part of a stateful prediction service within the service fabric cluster. The machine learning model may further be configured to predict build times for the one or more of the service instances associated with the stateless service.

Each of the collection of services may be configured to start and run independently of each other such that a move associated with a service from among the collection of services does not require a move for another service. A move for the one or more service instances from the first node associated with the service fabric cluster to the second node associated with the service fabric cluster may comprise: (1) seeding one or more service instances at the second node, (2) running code for the one or more service instances at the second node, and (3) shutting down code for the one or more service instances at the first node. Each of the first node and the second node may comprise at least one virtual machine.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, for reducing an interruption rate associated with a customer application offered as a collection of services, wherein the collection of services is offered via a service fabric cluster comprising service replicas for execution by nodes associated with the service fabric cluster, the method comprising:
    using a trained machine learning model, predicting one or more quiet time periods associated with each of the service replicas, wherein each of the one or more quiet time periods corresponds to a low value of a predicted load specifying a consumption of a metric by a respective service replica on a given node; and
    during the one or more quiet time periods predicted by the trained machine learning model, performing an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

2. The method of claim 1, wherein predicting the one or more quiet time periods associated with each of the service replicas comprises determining any periodicity associated with the consumption of the metric by a respective service replica.

3. The method of claim 1, wherein the metric comprises one of a physical metric, a logical metric, a combination of physical metrics, a combination of logical metrics, or a combination of physical metrics and logical metrics.

4. The method of claim 1, wherein the trained machine learning model is deployed as part of a stateful prediction service within the service fabric cluster, and wherein the trained machine learning model is further configured to predict build times for the one or more of the service replicas associated with the stateful service.

5. The method of claim 4, wherein each of the collection of services is configured to start and run independently of each other such that a move associated with a service from among the collection of services does not require a move for another service.

6. The method of claim 1, wherein the service replicas comprise one or more primary replicas, and wherein a move for the one or more primary replicas from the first node associated with the service fabric cluster to the second node associated with the service fabric cluster comprises: (1) building one or more secondary replicas for the stateful service at the second node, (2) promoting the one or more secondary replicas to a primary replica status at the second node, and (3) demoting the one or more primary replicas at the first node to a secondary replica status.

7. The method of claim 6, wherein the service replicas comprise one or more secondary replicas, and wherein a move for the one or more secondary replicas from the first node associated with the service fabric cluster to the second node associated with the service fabric cluster comprises: (1) seeding one or more secondary replicas at the second node, (2) running code for the one or more secondary replicas at the second node, and (3) shutting down code for the one or more primary replicas at the first node.

8. A system, including a processor, to reduce an interruption rate associated with a customer application offered as a collection of services, wherein the collection of services is offered via a service fabric cluster comprising service replicas for execution by nodes associated with the service fabric cluster, the system comprising:
    a prediction system configured to predict one or more quiet time periods associated with each of the service replicas, wherein each of the one or more quiet time periods corresponds to a low value of a predicted load specifying a consumption of a metric by a respective service replica; and
    a cluster resource manager configured to, during the one or more quiet time periods predicted by the prediction system, perform an impact-less failover for one or more of the service replicas associated with a stateful service by scheduling a move for the one or more service replicas from a first node associated with the service fabric cluster to a second node associated with the service fabric cluster such that the impact-less failover is performed to eliminate or reduce any interruptions of the customer application.

9. The system of claim 8, wherein the one or more predicted quiet time periods associated with each of the service replicas is determined in relation to any periodicity associated with the consumption of the metric by a respective service replica.

10. The system of claim 8, wherein the metric comprises one of a physical metric, a logical metric, a combination of physical metrics, a combination of logical metrics, or a combination of physical metrics and logical metrics.

11. The system of claim 8, wherein each of the collection of services is configured to start and run independently of each other such that a move associated with a service from among the collection of services does not require a move for another service.

12. The system of claim 11, wherein the service replicas comprise one or more primary replicas, and wherein a move for the one or more primary replicas from the first node associated with the service fabric cluster to the second node associated with the service fabric cluster comprises: (1) building one or more secondary replicas for the stateful service at the second node, (2) promoting the one or more secondary replicas to a primary replica status at the second node, and (3) demoting the one or more primary replicas at the first node to a secondary replica status.

13. The system of claim 12, wherein the service replicas comprise one or more secondary replicas, and wherein a move for the one or more secondary replicas from the first node associated with the service fabric cluster to the second node associated with the service fabric cluster comprises: (1) seeding the secondary replicas at the second node and (2) running the code for the one or more secondary replicas at the second node.

14. A method, implemented by a processor, for reducing an interruption rate associated with a customer application offered as a collection of services, wherein the collection of services is offered via a service fabric cluster comprising service instances for execution by nodes associated with the service fabric cluster, the method comprising:
  training a machine learning model to predict one or more quiet time periods associated with each of the service instances, wherein each of the one or more quiet time periods corresponds to a low value of a predicted load specifying a consumption of a metric by a respective service instance; and
  during the one or more quiet time periods predicted by the machine learning model, performing an impact-less failover for one or more of the service instances associated with a stateless service by scheduling a move for the one or more service instances from a first node associated with the service fabric cluster to a second node associated with the service fabric cluster such that the impact-less failover is performed to eliminate or reduce any interruptions of the customer application.

15. The method of claim 14, wherein predicting the one or more quiet time periods associated with each of the service instances comprises determining any periodicity associated with the consumption of the metric by a respective service instance.

16. The method of claim 15, wherein the metric comprises one of a physical metric, a logical metric, a combination of physical metrics, a combination of logical metrics, or a combination of physical metrics and logical metrics.

17. The method of claim 16, wherein the machine learning model is deployed as part of a stateful prediction service within the service fabric cluster, and wherein the machine learning model is further configured to predict build times for the one or more of the service instances associated with the stateless service.

18. The method of claim 17, wherein each of the collection of services is configured to start and run independently of each other such that a move associated with a service from among the collection of services does not require a move for another service.

19. The method of claim 14, wherein a move for the one or more service instances from the first node associated with the service fabric cluster to the second node associated with the service fabric cluster comprises: (1) seeding one or more service instances at the second node, (2) running code for the one or more service instances at the second node, and (3) shutting down code for the one or more service instances at the first node.

20. The method of claim 19, wherein each of the first node and the second node comprises at least one virtual machine.

\* \* \* \* \*